United States Patent [19]

Loree

[11] Patent Number: 5,499,679
[45] Date of Patent: Mar. 19, 1996

[54] METHOD OF IMPROVING OIL AND GAS WELL PRODUCTIVITY

[76] Inventor: Dwight N. Loree, 758 Woodpark Rd. SW., Calgary, Alberta, Canada, T2X 2S4

[21] Appl. No.: 307,901

[22] Filed: Sep. 16, 1994

[51] Int. Cl.$^6$ .............................. E21B 43/25; E21B 43/26
[52] U.S. Cl. ........................................ 166/308; 166/305.1
[58] Field of Search ................................ 166/308, 305.1, 166/268, 275, 271

[56] References Cited

U.S. PATENT DOCUMENTS

| | | | |
|---|---|---|---|
| 3,368,627 | 2/1968 | Hurst et al. | 166/308 X |
| 3,842,910 | 10/1974 | Zingg et al. | 166/308 |
| 3,913,672 | 10/1975 | Allen et al. | 166/305.1 |
| 4,519,455 | 5/1985 | Holtmyer et al. | 166/308 X |
| 4,701,270 | 10/1987 | Bullen et al. | |
| 4,825,952 | 5/1989 | Mzik | 166/308 |

FOREIGN PATENT DOCUMENTS

| | | | |
|---|---|---|---|
| 1134258 | 10/1982 | Canada | 166/21 |
| 1268325 | 5/1990 | Canada | |

OTHER PUBLICATIONS

Dresser Titan, $CO_2$ Engineering, T300, Brochure.
Hassen et al, "Improving oilwell stimulations with compatible oils", Journal of Canadian Petroleum Technology, At least as early as 1990.
Gruber, N. G. and Anderson, H. A., "Carbonated Hydrocarbons for Improved Gas Well Fracturing Results," CIM, Core Laboratories Canada Ltd. (about Feb. 1995).
Tudor, R., Vozniak, C., Banks, M. L., Peters, W., "Technical Advances in Liquid $CO_2$ Fracturing," Petroleum Society of CIM, Paper No. CIM 94-36. (Jun. 1994).
Lancaster, G., Sinal, M. L., "Liquid $CO_2$ Fracturing Advantages and Limitations," Petroleum Society of CIM, Paper No. CIM 86-37-69. (Jun. 1986).
Silva, M. K., Orr, Jr., F. M., "Effect of Oil Composition on Minimum Miscibility Pressure—Part 1: Solubility of Hydrocarbons inn Dense $CO_2$". SPE (Nov. 1987).
Silva, M. K., Orr, Jr., F. M., "Effect of Oil Composition on Minimum Miscibility Pressure—Part 2: Correlation". SPE (Nov. 1987).
Holm, L. W., Josendal, V. A., "Effect of Oil Composition on Miscible–Type Displacement by Carbon Dioxide." SPE (Feb. 1982).
Holm, L. W., Josendal, V. A., "Mechanisms of Oil Displacement by Carbon Dioxide." SPE–AIME (Dec. 1974).

(List continued on next page.)

*Primary Examiner*—Stephen J. Novosad
*Attorney, Agent, or Firm*—Christensen, O'Connor, Johnson & Kindness

[57] ABSTRACT

A method of improving oil or gas well productivity from a well penetrating a formation in an oil or gas reservoir, by forming a load fluid by obtaining a hydrocarbon fluid containing a known percentage of aromatics and adding an amount of $CO_2$ to the hydrocarbon fluid that is determined according to a predetermined miscibility relationship between the $CO_2$ and the hydrocarbon fluid that establishes the amount of $CO_2$ required to form a bank of $CO_2$ ahead of the load fluid in the formation. The load fluid is applied to the well at a pressure such that $CO_2$ in load fluid within the well bore remains in solution and $CO_2$ in load fluid within the formation leaks off the load fluid into the formation and forms a bank of $CO_2$ ahead of the load fluid. The surface pressure is released from the load fluid and the load fluid flows back out of the well. The miscibility relationship between $CO_2$ and hydrocarbon based load fluids depends on the aromatic content of the load fluid. For high pressure wells, since the amount of $CO_2$ required becomes excessive, it is preferable to use a load fluid that requires a smaller amount of $CO_2$ to form a bank in front of the load fluid for a given amount of the load fluid, hence one that has a lower amount of aromatics. The aromatic content of the hydrocarbon fluid is selected according to the pressure required for the well treatment.

11 Claims, 2 Drawing Sheets

OTHER PUBLICATIONS

Keelan, D. K., and Koepf, E. H., "The Role of Cores and Core Analysis in Evaluation of Formation Damage." *Journal of Petroleum Technology*, pp. 482–490.

Craft, J. R., Waddell, S. P., McFatridge, D. G., "$CO_2$–Foam Fracturing With Methanol Successfully Stimulates Canyon Gas Sand." SPE (May 1992).

Deysarker, A. K., Dawson, J. C., Acharya, A. R., "Experience With $CO_2$–Laden Fracturing Fluid for Stimulating Water–Sensitive Formations." Paper No. 16193, SPE (Mar. 1987).

Harris, P. C., "Dynamic Fluid–Loss Characteristics of $CO_2$–Foam Fracturing Fluids." SPE (May 1987).

Ward, V. L., "$N_2$ and $CO_2$ in the Oil Field: Stimulation and Completion Applications." SPE (Jul. 1986).

Reidenbach, V. G., Harris, P. C., Lee, Y. N., Lord, D. L., "Rheological Study of Foam Fracturing Fluids Using Nitrogen and Carbon Dioxide." SPE (Jan. 1986).

Fairless, C. M., and Joseph, W., "Effective Well Stimulation With Gelled Methanol/Carbon Dioxide Fracturing Fluids." SPE (Apr. 1986).

Wamock, Jr., W. E., Harris, P. C., King, D. S., "Successful Field Applications of $CO_2$–Foam Fracturing Fluids in the Arkansas–Louisiana–Texas Region." SPE (Jan. 1985).

Harris, P. C., Haynes, R. J., Egger, J. P., "The Use of $CO_2$–Based Fracturing Fluids in the Red Fork Formation in the Anadarko Basin, Oklahoma." SPE (Jun. 1984).

King, S. R., "Liquid $CO_2$ for the Stimulation of Low–Permeability Reservoirs." SPE (Mar. 1983).

Black, H. N., Langsford, R. W., "Energized Fracturing With 50% $CO_2$ for Improved Hydrocarbon Recovery." SPE (Jan. 1982).

Lillies, A, T., "Sand Fracturing With Liquid Carbon Dioxide." SPE (Aug. 1982).

Driscoll, P. L., Bowen, J. G., Roberts, M. A., "Oil Base Foam Fracturing Applied to the Niobrara Shale Formation." AME (Sep. 1980).

METHOD OF IMPROVING OIL AND GAS WELL PRODUCTIVITY

FIELD OF THE INVENTION

This invention relates to methods of oil and gas well treatment.

BACKGROUND OF THE INVENTION

Oil and gas well treatments are notorious for unexpected results. What may increase production in one well may shut off another well. Yet a successful well treatment can significantly increase production of a well and extend its production life, with rapid economic payback of the cost of the well treatment. Significant research is therefore devoted to improving well treatments.

One such common well treatment is the fracturing of a well formation using various load fluids and proppants to increase formation permeability, commonly known as a frac. Pressure on load fluid in the well causes cracks to form in the formation and proppants (sand, for example) injected into the well with the load fluids become wedged in the cracks, thus keeping the cracks open and increasing permeability. Various load fluids are used for fracturing, including oils, water, methanol and other alcohols, carbon dioxide, explosives, and acids.

In Canadian patent no. 1,268,325 of Mzik there is described a method of treating a well formation penetrated by a wellbore which comprises injecting down the wellbore and into the formation a fluid mixture comprising a mixture of carbon dioxide and a hydrocarbon fluid containing aromatics at a pressure sufficient to cause fracturing of the formation.

It has been found that fracturing a well with a mixture of carbon dioxide and hydrocarbon fluid containing aromatics yields variable recovery of load fluid in the general case, and thus an uncertain economic return from the use of the method. Low recovery of load fluid may cause a reduction in permeability of the formation, with consequent decline in production from the well. Hence, the economic efficiency of application of the method of Mzik to an oil or gas well is somewhat uncertain, and may in fact be deleterious to the well productivity. Yet the use of carbon dioxide and a hydrocarbon fluid containing aromatics may provide significant economic benefits as shown by the example in the patent of Mzik.

SUMMARY OF THE INVENTION

The inventor has investigated the treatment of oil and gas reservoirs with load fluids including hydrocarbons and carbon dioxide. During a frac with such a load fluid, the carbon dioxide drives the load fluid into the formation containing oil and gas under frac pressure. Upon release of the frac pressure, the reservoir pressure drives the load fluid back out of the well.

In most wells the reservoir drive pressure is caused by methane in the reservoir. The inventor has found that methane is not miscible in a hydrocarbon based load fluid that contains carbon dioxide that is totally miscible in the load fluid. Hence, the methane tends to finger into such a load fluid, and thus fails to drive a portion, perhaps a substantial portion, of the load fluid out of the reservoir. This loss of load fluid may decrease permeability of the well, hence decrease production from the well.

The inventor has found that when carbon dioxide forms a bank in front of the load fluid, the methane mixes with the carbon dioxide, and does not finger into the load fluid. Thus, upon release of the fracturing pressure, the methane drives a mixture of $CO_2$ and methane which in turn drives the load fluid back out of the well.

Therefore, the inventor proposes a method of improving oil or gas well productivity from a well penetrating a formation in an oil or gas reservoir, the method comprising the steps of:

forming a load fluid by obtaining a hydrocarbon fluid containing a known percentage of aromatics and adding an amount of carbon dioxide to the hydrocarbon fluid;

the amount of carbon dioxide being determined according to a predetermined miscibility relationship between the carbon dioxide and the hydrocarbon fluid that establishes the amount of carbon dioxide required to form a bank of carbon dioxide ahead of the load fluid in the formation;

applying the load fluid to the well at a pressure such that carbon dioxide in load fluid within the well bore remains in solution and carbon dioxide in load fluid within the formation leaks off the load fluid into the formation and forms a bank of carbon dioxide ahead of the load fluid; and releasing the surface pressure from the load fluid and flowing the load fluid back out of the well.

In addition, it has been found that the miscibility relationship between carbon dioxide and hydrocarbon based load fluids depends on the aromatic content of the load fluid. For high pressure wells, since the amount of carbon dioxide required becomes excessive, it is preferable to use a load fluid that requires a smaller amount of carbon dioxide to form a bank in front of the load fluid for a given amount of the load fluid, hence one that has a lower amount of aromatics. Therefore, the inventor also proposes, in a further aspect of the invention, to select the aromatic content of the hydrocarbon fluid according to the pressure required for the well treatment.

In an extension of the method of the invention, the method is believed applicable to the treatment with a load fluid of any formation penetrated by a well in which formation gas is immiscible in the load fluid. The invention then comprises the use of a fluid in which the formation gas is miscible and which in turn is miscible in the load fluid.

BRIEF DESCRIPTION OF THE DRAWINGS

There will now be described preferred embodiments of the invention, with reference to the drawings, by way of illustration, in which.

DETAILED DESCRIPTION OF PREFERRED EMBODIMENTS

Figure 1:
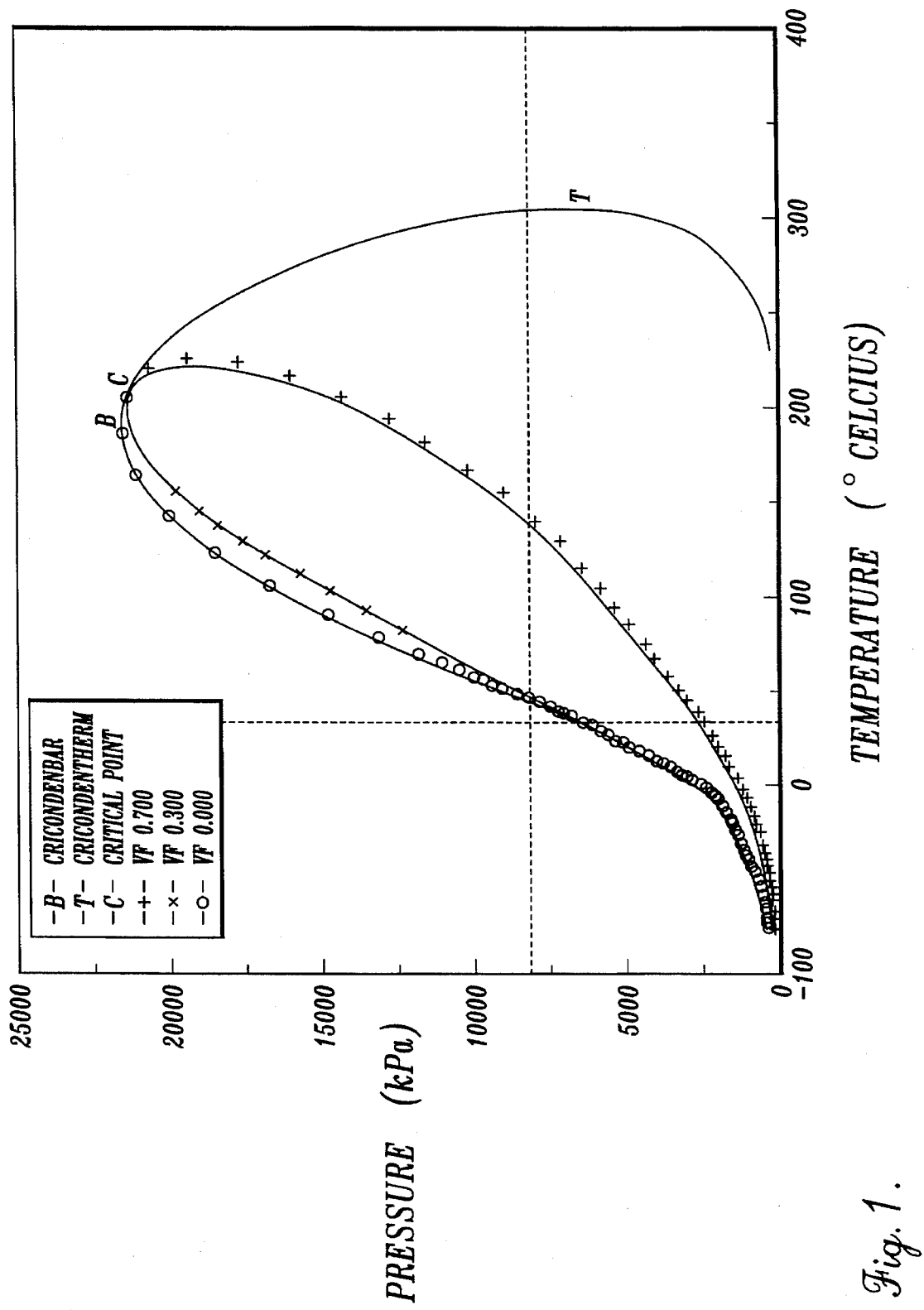
FIG. 1 is a graph showing a phase envelope for a mixture of hydrocarbon frac fluid and carbon dioxide.

The method of the invention is carried out as follows. For a given well treatment, where the well penetrates a formation in an oil or gas reservoir, the pressure and temperature of the well is found from information from the well operator. Then, a load fluid is formed by obtaining a hydrocarbon fluid containing a known percentage of aromatics and adding an amount of carbon dioxide to the hydrocarbon fluid. The hydrocarbon fluid is preferably a light petroleum distillate, the preferred cut is about 100° C. and greater. A good example is frac fluid known as FRACSOL™ fluid, derived from the Sundre C5+ condensate available from Trysol Canada Limited of Calgary, Alberta, Canada distilled to 110° C. It includes the following constituents (with volume fraction in parentheses as determined by gas chromatography): heptanes (0.0072), octanes (0.1191), nonanes (0.1028), decanes (0.1143), undecanes (0.0927), dodecanes (0.0687), tridecanes (0.0598), tetradecanes (0.0449), pentadecanes (0.0366) and smaller quantities of $C_{16}+$ alkanes, as well as smaller quantities of toluene (0.0131), benzene and xylene (ethylbenzene, p+ m-xylene 0.0371, o-xylene 0.0156, 1,2,4 trimethylbenzene 0.0158). However, actual aromatic content is believed to be about 35% (the gas chromatography does not distinguish between some aromatics and alkanes). The following products of Dome Petroleum Limited of Calgary, Alberta, may also be used: FRAC OIL 120, FRAC OIL 200, FRAC OIL 300, FRAC and OIL 500, as well as SUPER FRAC™ made by Home Oil Company Limited of Calgary, Alberta. A product with increased xylene, for example XYSOL fluid available from Trysol Canada Ltd., may also be useful with actual aromatic content at about 70% or greater.

Figure 2:
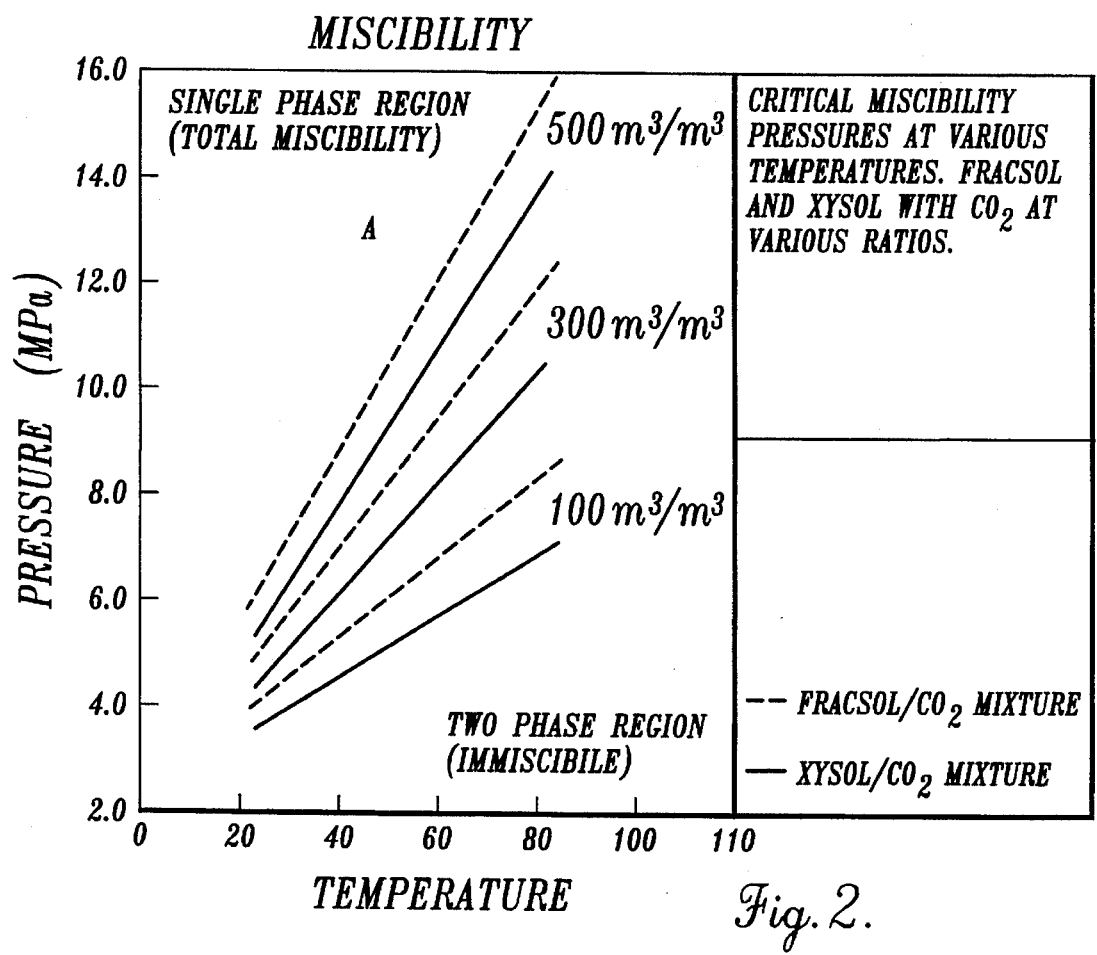
FIG. 2 is a graph showing the miscibility relationship of carbon dioxide at various pressures and temperatures for two fluids containing different amounts of aromatics.

The amount of carbon dioxide to be added to the hydrocarbon fluid is determined according to a predetermined miscibility relationship between the carbon dioxide and the hydrocarbon fluid, as for example shown in FIGS. 1 and 2. In FIG. 2 is shown the miscibility relationship for FRACSOL fluid and XYSOL fluid. The miscibility relationship establishes the amount of carbon dioxide required to form a bank of carbon dioxide ahead of the load fluid in the formation. At the frac pressure, the carbon dioxide should be totally miscible in the hydrocarbon fluid (area 10 in FIGS. 1 and 2). At a pressure between the frac pressure and the formation pressure, the carbon dioxide should come out of solution to form the bank ahead of the load fluid. It is preferred that the bank occupy between 10% and 100% of the pore volume of the reservoir, with the higher rates (near 100%) preferred. Thus, if the amount of carbon dioxide that would be miscible in the load fluid is about $300 m^3/m^3$ at the formation pressure and temperature, then an amount of carbon dioxide about $500 m^3/m^3$ should be added to the hydrocarbon fluid. In the formation, the load fluid in cracks in the formation and in the well bore will have pressure equal to the static pressure plus added pressure due to frac pressure. With increasing distance within the formation from the cracks communicating with the well bore, the pressure gradually decreases to the formation pressure. It is believed essential that the amount of carbon dioxide in the load fluid should be sufficient that some portion of the carbon dioxide comes out of solution within the area where the pressure gradually reduces to formation pressure.

Figure 3:
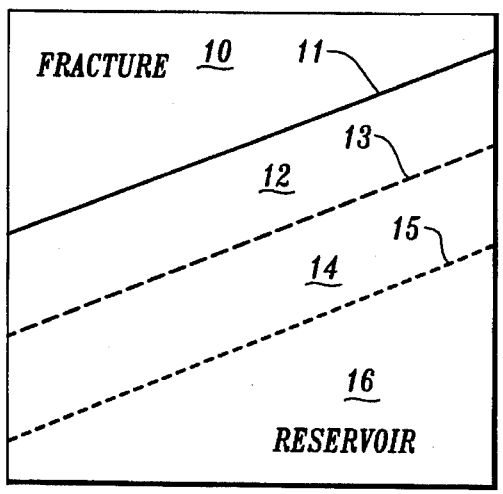
FIG. 3 is a section through a hypothetical reservoir and fracture zone showing fluid distribution zones during a well treatment according to the invention.

FIG. 3 shows a section from a reservoir identifying a fracture zone 10, and reservoir 16, with intermediate zones 12 and 14. From the far field reservoir with no carbon dioxide and high concentration of methane (being entirely reservoir gas) at zone 16, the reservoir composition graduates from pure methane at boundary 15 to part methane part carbon dioxide in zone 14, and then to pure carbon dioxide approximately at 13. This is a first miscible bank. A second miscible bank starts with the pure carbon dioxide and gradually becomes denser through zone 12 as the concentration of the hydrocarbon liquid base fluid increases until it reaches 75–80% base liquid and 20–25% carbon dioxide that remains in the fracture and the well bore beginning at the fracture boundary 11.

This load fluid is applied to the well at a fracturing pressure such that carbon dioxide in load fluid within the well bore remains in solution and carbon dioxide in load fluid within the formation leaks off the load fluid into the formation and forms a bank of carbon dioxide ahead of the load fluid. If the amount of carbon dioxide is selected as described above, then this will occur when fracturing pressure is applied to the well.

Next, surface pressure is released from the load fluid and the load fluid flows back out of the well. For flow back, the amount of carbon dioxide is reduced to an amount of carbon dioxide that is effectively totally in solution at the formation pressure. For the example described above this would be about $300 m^3/m^3$. The pressure during flow back should not be released too quickly, otherwise the methane may drive into and finger into the load fluid, which may lead to an undesirable amount of load fluid remaining in the pores of the formation.

For wells with very high pressure, for example 16MPa, a large amount of carbon dioxide is required for load fluids with a moderate amount (35% of aromatics). Thus, it is desirable to select a load fluid having a lower proportion of aromatics, as for example 10%–20%, for higher pressure wells. The load fluid aromatic content is thus selected according to the pressure of the well formation. For wells with low pressure, a load fluid with larger amounts of aromatics is desired, such as XYSOL fluid, since more carbon dioxide can be added in solution to load fluids with larger amounts of aromatics.

For some wells, it may be desirable to use the same or a similar fluid at lower than fracturing pressures, but the same technique is still used to ensure complete flowback of the load fluid.

EXAMPLE

The Dunvegan formation in the Waskahigan area of northwestern Alberta, is typically low in liquid saturation. In the past, many types of frac fluids have been used on this formation. The well Amoco Waskahigan 15-12 for example had been fractured with an emulsified mixture of aqueous and hydrocarbon bases. This mixture was not miscible with the reservoir gases. Production tests indicated the well was capable of about $10(10^3) m^3/day$.

The formation static pressure is approximately 8,500 kPa and temperature is 50 degrees C. The well was cased with 177.8 mm casing down to a formation depth of ca. 1450 m. Formation permeability was 1.6 md average, porosity was about 11% and water saturation was 30%.

Evaluation of the miscibility data showed that at this temperature and pressure 350 $m^3/m^3$ (35% by volume) of $CO_2$ is miscible in FRACSOL fluid (see FIG. 2). The fracture treatment was executed with a pad volume of 20 $m^3$ of Fracsol hydrocarbon aromatic fracturing fluid and $CO_2$ mixture. The $CO_2$ was mixed at 550 $m^3/m_3$ (50% by volume). Fracturing pressures at surface were 20,000 kPa and 24,600 kPa in the formation. All the $CO_2$ remains in solution in the surface lines, bottom of the hole and in the fracture as the pressure remains above 11,000 kPa where the gas starts to evolve (see FIG. 2). However, as the fluid leaks off, the pressure gradually drops below 11,000 kPa and $CO_2$ comes out of solution until at the reservoir pressure of 8,500 kPa only 350 $m^3/m^3$ of $CO_2$ remains in solution. This evolved $CO_2$ forms a miscible bank between the reservoir gas methane and the fracturing fluid $CO_2$ mixture.

The remainder of the fracture treatment consisted of FRACSOL hydrocarbon aromatic fracturing fluid and $CO_2$ mixture. The $CO_2$ was mixed at the lower concentration of 350 $m^3/m^3$ (35% by volume) necessary for flow back.

After the treatment, 70% of the treating fluid was recovered. This is considered a high percentage recovery. Productivity increased to 38 $(10^3)m^3$/day.

The load fluid should be formation compatible, as would be understood by a person skilled in the art. For example, it should not precipitate waxes or asphaltenes to any great extent, which can be determined experimentally before application of the fluid. The carbon dioxide forms a drive fluid, which in the generalized invention is miscible in the load fluid and in which the reservoir gas is miscible at well treatment pressures and temperatures (for example during fracturing, but also during lower pressure treatments as for example squeezing).

A person skilled in the art could make immaterial modifications to the invention described and claimed in this patent without departing from the essence of the invention.

The embodiments of the invention in which an exclusive property or privilege is claimed are defined as follows:

1. A method of improving gas well productivity from a well penetrating a formation in a gas reservoir, the method comprising the steps of:

forming a load fluid by obtaining a hydrocarbon fluid containing a known percentage of aromatics and adding an amount of carbon dioxide to the hydrocarbon fluid;

the amount of carbon dioxide being determined by reference to a predetermine miscibility relationship between the carbon dioxide and the hydrocarbon fluid that establishes the amount of carbon dioxide required to form a bank of carbon dioxide ahead of the load fluid in the formation;

injecting the load fluid into the gas well at a pressure such that carbon dioxide in load fluid within the well bore remains in solution and carbon dioxide in load fluid within the formation comes out of solution and forms a bank of carbon dioxide ahead of the load fluid; and releasing the surface pressure from the load fluid and flowing the load fluid back out of the gas well.

2. The method of claim 1 in which the load fluid is applied to the well at fracturing pressures.

3. The method of claim 2 in which the amount of carbon dioxide injected with the load fluid is reduced for flow back.

4. The method of claim 3 in which the amount of carbon dioxide injected with the load fluid is reduced during flow back to an amount at which the carbon dioxide is totally miscible in the load fluid at the reservoir conditions.

5. The method of claim 2 in which the pressure is released by reduction of surface pressure applied to the load fluid.

6. The method of claim 2 in which the aromatic content hydrocarbon fluid is selected according to the formation pressure.

7. A method of improving gas well productivity from a gas well penetrating a formation containing reservoir gas in a gas reservoir, by treatment with a formation compatible load fluid in which the reservoir gas is not miscible, the method comprising the steps of:

forming a load fluid by obtaining a quantity of the formation compatible load fluid and adding an amount of a drive fluid that is miscible in the load fluid and in which the reservoir gas is miscible at well treatment pressures and temperatures;

the amount of drive fluid being determined by reference to a predetermined miscibility relationship between the drive fluid and the load fluid that establishes the amount of drive fluid required to form a bank of drive fluid ahead of the load fluid in the formation;

injecting the load fluid into the gas well at a pressure such that drive fluid in load fluid within the well bore remains in solution and drive fluid in load fluid within the formation comes out of solution and forms a bank of drive fluid ahead of the load fluid; and releasing the surface pressure form the load fluid and flowing the load fluid back out of the gas well.

8. The method of claim 7 in which the load fluid is applied to the gas well at fracturing pressures.

9. The method of claim 8 in which the amount of drive fluid injected with the load fluid is reduced during flow back.

10. The method of claim 9 in which the amount of drive fluid injected with the load fluid is reduced during flow back to an amount at which the fluid is totally miscible in the load fluid at the reservoir conditions.

11. The method of claim 7 in which the composition of the hydrocarbon fluid is selected according to the frac pressure.

* * * * *

UNITED STATES PATENT AND TRADEMARK OFFICE
CERTIFICATE OF CORRECTION

PATENT NO. : 5,499,679
DATED : March 19, 1996
INVENTOR(S) : D.N. Loree

It is certified that error appears in the above-indentified patent and that said Letters Patent is hereby corrected as shown below:

COLUMN    LINE

6    33    "form" should read --from--
(Claim 7,  line 21)

Signed and Sealed this

Twentieth Day of August, 1996

Attest:

BRUCE LEHMAN

Attesting Officer    Commissioner of Patents and Trademarks